United States Patent Office
3,829,431
Patented Aug. 13, 1974

3,829,431
PROCESS FOR THE PREPARATION OF CERTAIN INDOLOBENZAZEPINE DERIVATIVES
Joel G. Berger, Freeport, and Sonia R. Teller, New York, N.Y., assignors to Endo Laboratories, Inc., Garden City, N.Y.
No Drawing. Filed Apr. 19, 1972, Ser. No. 245,301
Int. Cl. C07d 31/50
U.S. Cl. 260—294.8 A
10 Claims

ABSTRACT OF THE DISCLOSURE

A two-step process for the preparation of 1,2,3,4,8,9-hexahydro-(3-substituted)pyrido[4′,3′:2,3]indolo[1,7-ab][1]benzazepines, useful as tranquilizers and/or analgesics in warm-blooded animals, or as intermediates in the preparation of these, involves reaction of N-nitrosoiminodibenzyl with 4-piperidone or an N-substituted derivative of 4-piperidone in the presence of zinc and acetic acid, and cyclization of the resulting hydrazone with strong acid.

BACKGROUND OF THE INVENTION

This invention relates to a process for the preparation of 1,2,3,4,8,9-hexahydropyrido[4′,3′:2,3]indolo[1,7 - ab][1]benzazepine derivatives many of which are useful as tranquilizers and/or analgesics in warm-blooded animals, or as intermediates in the preparation of these.

One possible process for the preparation of these and related compounds is described in U.S. Pat. 3,457,271 (to Cohen et al.). This process follows the sequence of reactions shown below:

REACTION SCHEME (1)

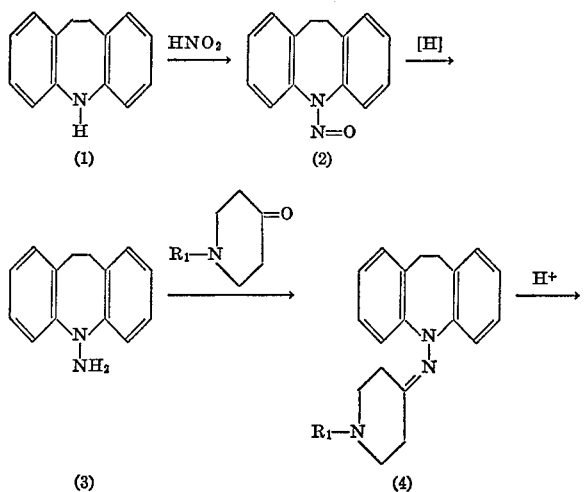

where $R_1$ is a straight or branched-chain alkyl having 1–7 carbon atoms.

In this process, iminodibenzyl (1) is nitrosated to N-nitrosoiminodibenzyl (2) which is reduced with an alkali metal-Group III metal hydride to the corresponding N-aminoiminodibenzyl (3); the latter is contacted with an N-substituted-4-piperidone to give the corresponding hydrazone (4) which is cyclized in the presence of a strong acid to the desired compound (5).

Linnell et al. [J. Chem. Soc. 125, 2451 (1924)] reported the preparation of 1,2,3,4-tetrahydro-9-phenylcarbazole by reaction of nitrosodiphenylamine with zinc dust and glacial acetic acid in the presence of cyclohexanone, as well as the indolization of 5-nitroso-5H-dibenz[b,e][1,4]diazepin-11-one. When the work of Linnell et al. was repeated by Applicants, but substituting N-methyl-4-piperidone for cyclohexanone, quantitative fission of the N-NO bond was observed, and the starting 5H-dibenz[b,e][1,4]diazepin-11-one was recovered.

If the synthesis of 1,2,3,4,8,9-hexahydropyrido-[4′,3′:2,3]indolo[1,7-ab][1]benzazepine derivatives could be simplified, substantial savings in equipment, materials and manpower would result.

SUMMARY OF THE INVENTION

According to the present invention, it has now been discovered that 1,2,3,4,8,9 - hexahydropyrido[4′,3′:2,3]indole[1,7-ab][1]benzazepines of the following formula (6) can be obtained readily in a reaction starting with an appropriate N-nitrosoiminodibenzyl. While the compounds which are prepared by the present process are related to and some are identical with those described in U.S. Pat. 3,457,271 and represented there by the above formula (5), the nomenclature and mode of display in the present case are based on the IUPAC 1957 Rules, as is shown below in formula (6):

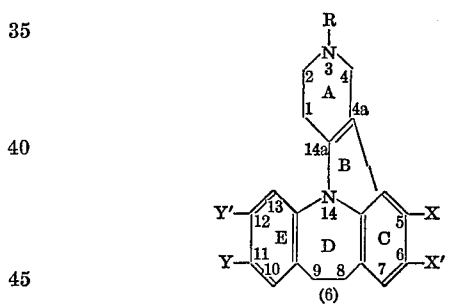

wherein rings E and D form the benzazepine portion of the molecule; rings B and C form the indolo portion; and ring A forms the pyrido portion.

In the above formula,

R is H;
    a $C_1$–$C_{12}$ hydrocarbon radical;
    a $C_nH_{(2n-1)}$ Z group, wherein
        n is a positive integer of 3–6;

$$a-\overset{\overset{O}{\|}}{C}-R' \text{ group; or}$$

$$a-\overset{\overset{O}{\|}}{C}-OR° \text{ group; wherein}$$

Z is oxygen or sulfur; R′ is a $C_1$–$C_{11}$ hydrocarbon radical or a $C_mH_{(2m-1)}$ Z group, m being a positive integer of 2–5; R° is a $C_1$–$C_4$ alkyl, benzyl, or tetrahydropyranyl; and X, X′, Y, and Y′ individually are hydrogen, fluorine, chlorine, bromine, trifluoromethyl, a $C_1$–$C_4$ alkyl or a $C_1$–$C_4$ alkoxyl; provided that one of X and X′ and one of Y and Y′ must be hydrogen.

The present process is a two-step reaction which can be represented by the following Reaction Scheme (2):

REACTION SCHEME (2)

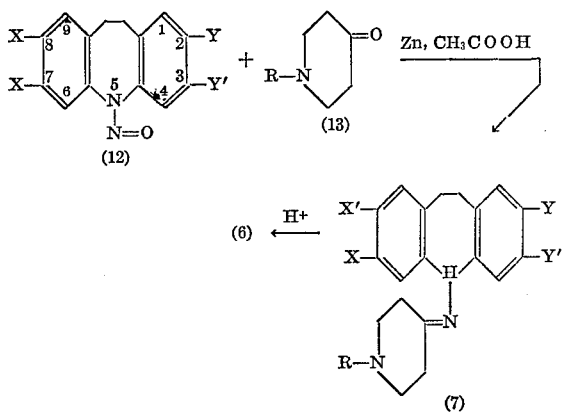

The first step, the reaction of the N-nitrosoiminodibenzyl with a substituted 4-piperidone, is carried out at a temperature of 15–35° C.; while the second step, acid-catalyzed cyclization, is carried out at a temperature of 50–80° C.

DETAILED DESCRIPTION OF THE INVENTION

In the preferred embodiment of the present invention, the N-nitrosoiminodibenzyl is contacted with an appropriate N-substituted 4-piperidone and with an excess of metallic zinc in a reduction resistant solvent such as, for example, ethanol. The metallic zinc is preferably present in an amount between 2 and 5 gram-atoms of zinc per mole of the N-nitrosoiminodibenzyl. Larger amounts of zinc than 5 gram-atoms per mole can be used, but increasing the amounts of zinc does not improve the yields and sometimes may cause more difficult separation and/or zinc disposal problems. While zinc employed in the process of the present invention is preferably in powder form, it is understood that larger zinc aggregates, such as granules, slugs, or wire can also be used. Nevertheless, zinc powder is the most practical because it has a high reactive surface area and reacts readily under the conditions of the present process.

Glacial acetic acid is then added to the well-agitated mixture of the N-nitrosoiminodibenzyl with zinc and the piperidone in the reaction solvent. The amount of acetic acid is preferably about 2 moles per gram-atom of zinc in the reaction mixture. Less than 2 moles of glacial acetic acid per gram-atom of zinc can be used, so long as the stoichiometry of the reaction with the N-nitrosoiminodibenzyl is satisfied. Large amounts of glacial acetic acid are unnecessary but can be tolerated by the reaction medium. Usually, this reaction is carried out in the absence of water, but small amounts of water can be present and do not adversely affect the reaction. Reduction resistant solvents other than ethyl alcohol include other lower alkanols such as methanol, isopropyl alcohol, and tertiary butyl alcohol; ethylene glycol; monomethyl and monoethyl ethers of ethylene glycol; ethers such as tetrahydrofuran or dioxane, dimethyl and diethyl ethers of mono- and diethylene glycol; benzene, toluene and similar aromatic hydrocarbons. Glacial acetic acid is normally added to the agitated reaction mixture portionwise to avoid overheating of the reaction mixture. Although the reaction can be run within a range of about 15° C. to about 35° C., at the lower end of this range the reaction becomes too slow to be practical, while at the higher end there is noticeable reversion of the N-nitrosoiminodibenzyl to the corresponding iminobenzyl. The preferred temperature range for this reaction is 20–25° C. After all the acetic acid has been added, the reaction mixture is stirred for an additional period of several hours at about 20–25° C. Usually this stirring period will be about 4–8 hours.

This first step produces the hydrazone (7) which is cyclized by a strong acid. It is necessary to separate the solution from the solid prior to the cyclization step because of the danger of violent reaction between the acid and the unchanged zinc. This separation can be accomplished by filtration, decantation, centrifugation, or any other suitable technique. Most strong acids are useful in the cyclization step, including hydrochloric acid, sulfuric acid, phosphoric acid, various monoesters of sulfuric acid, trifluoroacetic acid, trichloroacetic acid, nitric acid, and sulfonic acids such as p-toluenesulfonic or methanesulfonic acid.

The cyclization step is carried out at about 50–80° C. for a period of about a few minutes to one hour or more. Higher temperatures than about 80° C. are undesirable because of the danger of excessive degradation of the reaction components or products, while below 50° C. the cyclization rate is relatively slow and therefore sometimes impractical.

The desired product of formula (6) is recovered in any suitable manner. As preferred work-up procedure, the inorganic salts are filtered off, and the filtrate is diluted with water or evaporated and then extracted with ether or other suitable solvents, such as benzene, ethyl acetate, dichloromethane or chloroform. This treatment removes the nonbasic impurities. The extracted aqueous solution is made basic, for example, with aqueous sodium hydroxide, and the reaction product crystallizes out of this solution. Other variations of this process will be immediately apparent to one skilled in the art and obviously are intended to be within the scope of the present invention.

The starting N-nitrosoiminodibenzyl (IUPAC nomenclature: (10,11-dihydro-5-nitroso-5H-dibenz[b,f]azepine) in which $X=X'=Y=Y'=H$, is an old compound, first described by Thiele et al. [Justus Liebigs Ann. Chem. 305, 100 (1899)], who prepared the compound in the cold by addition of sodium nitrite and acetic acid to an ethereal solution of iminodibenzyl (10,11-dihydro-5H-dibenz[b,f] azepine by IUPAC nomenclature). Other starting N-nitrosoiminodibenzyls are prepared in a similar manner, by reaction of sodium nitrite in the cold with an appropriate iminodibenzyl, in a solution of acetic acid or aqueous acetic acid, or in a solution of dimethylformamide or aqueous dimethylformamide, followed by the dropwise addition of dilute hydrochloric acid. The preparation of the requisite iminodibenzyls, substituted in the 2 or the 3 position, and/or the 7 or the 8 position, with a halogen, a lower alkyl group, a fluorinated lower alkyl group, or a lower alkoxy group has been adequately described in the literature. Thus, 2-fluoro-, 2-ethyl-, 2,8-dibromo-, 2,8-dimethyl-, 3-chloro- and 3,7-dichloro-, 3-(trifluoromethyl)- and 3,7-bis(trifluoromethyl)-, 3-methoxy- and 3,7-dimethoxy-, 3,7-diisopropyl-, 3,7-diethoxy-, 3-chloro-7-(trifluoromethyl)- and 3,7-dichloro-5H-dibenz[b,f]azepines or -10,11-dihydro-5H-dibenz[b,f]azepines have been described in one or more of the following publications: British Pat. Nos. 777,546 (1957), 792,615 (1958) and 854,553 (1960); U.S. Pat. Nos. 2,965,639 (1960), 3,016,373 (1962) and 3,074,931 (1963); Chem. Ber. 93, 1257 (1960); Helv. Chim. Acta 44, 753 (1961); and J. Med. Chem. 12, 913 (1969). The 5-H-dibenz[b,f]azepines can be converted to the desired 10,11-dihydro derivatives by catalytic hydrogenation over 5% paladium-on-charcoal or Raney nickel in alcoholic solution.

It has been found that the above reaction sequence can be run not only with N-substituted 4-piperidones, but also with 4-piperidone itself to yield the compound of formula (6) in which R is H. This base will be hereafter designated as base (8) or compound (8). The desired R group can then be introduced into this molecule by several methods, including the three exemplified in the following Reaction Scheme (3):

A. Acylation, followed by reduction of

group;

B. Reductive amination of carbonyl compounds,

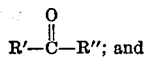

C. Alkylation with an alkyl halide,

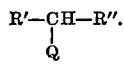

REACTION SCHEME (3)

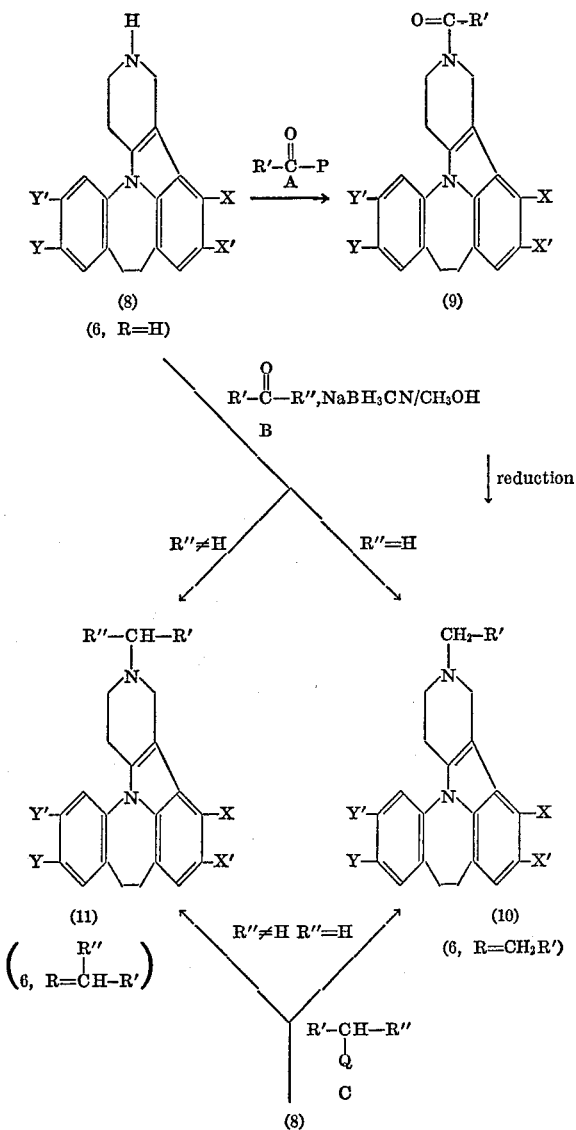

These reactions can be carried out, for example, as described below:

A. Treatment of the unsubstituted base (8) with an appropriate acylating agent such as an acid halide (P=Br or Cl), an ester (P is an alkoxy group having 1-4 carbon atoms), an anhydride

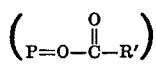

such as acetic anhydride, propionic anhydride or cyclopropanecarboxylic acid anhydride, or a mixed anhydride

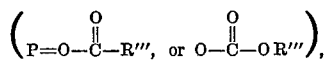

in which R''' is hydrogen or an alkyl having 1-4 carbon atoms or benzyl, such as the anhydride of formic acid with acetic acid, or the anhydride of cyclobutanecarboxylic acid with ethyl carbonate, gives rise to amide (9), which is reduced to the desired end product (10), in which the CH₂R' group corresponds to the R group of formula (6).

This reduction is carried out in a manner generally well known to organic chemists, using reducing agents such as lithium aluminum hydride or borane, in an ethereal solvent such as tetrahydrofuran, ethylene glycol dimethyl ether, or diethylene glycol dimethyl ether. Instead of using preformed borane, the borane can be generated from a mixture of sodium borohydride and a Lewis acid such as boron trifluoride or aluminum chloride; or lithium aluminum hydride can be used in place of sodium borohydride with the Lewis acid, in a solvent such as ether or tetrahydrofuran. Alternatively, instead of sodium borohydride, potassium borohydride and lithium chloride in diethylene glycol dimethyl ether can be used. In the preferred mode of operation, amide (9) is reduced by means of lithium aluminum hydride in tetrahydrofuran [cf. Gaylord: Reduction with Complex Metal Hydrides, New York, Interscience Publishers, 1956, pp. 544-592], or by the use of Vitride™, a 70% benzene solution of sodium bis(2-methoxyethoxy)aluminum hydride [NaAlH₂(OCH₂CH₂OCH₃)₂], in benzene or toluene, by the method of Cerny et al. [Coll. Czech. Chem. Commun. *34*, 1033 (1969)—cf. Eastman Organic Chemical Bulletin, Vol. 42, No. 3, 1970]. The reduction includes the step of decomposing the intermediate addition compound with dilute base.

B. In this method, the desired R group can be attached to the nitrogen in the 3-position of the unsubstituted base (8) in one step. The link can be formed either through a primary or through a secondary carbon atom, by condensing an aldehyde (R''=H) or a ketone (R''≠H) with amine (8) in the presence of a selective reducing agent to yield (10) or (11), in which the CH₂R' group or the CHR'R'' group, respectively, corresponds to the R group of formula (6). The selective reducing agent used is sodium cyanohydridoborate (NaBH₃CN), which has been shown by Borch et al. [J. Am. Chem. Soc. *93*, 2897 (1971)] to reduce carbonyl compounds only at a lower pH than is required for their condensation with amines and subsequent reduction of the resulting imminium compounds. Thus, by carrying out the reaction in methanol at a pH above 4, the condensation of the carbonyl reagent with amine (8) and the reduction of the imminium intermediate thus formed are promoted, and the one-step conversion of the amine (8) to either (10) or (11) is effected without the carbonyl reagent itself being reduced. Addition of Linde Molecular Sieve™, type 3A, catalyzes this conversion by absorbing the water formed by the condensation of the carbonyl reagent with the amine.

C. Alkylation of amine (8) by the reagent

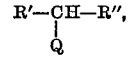

where Q is a halogen (Q=Cl, Br or I), the residue of an organic sulfate

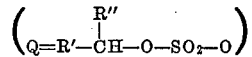

or the residue of an alkyl or aryl sulfonate, such as mesylite (Q=CH₃—SO₂—O) or a tosylate (Q=p-CH₃—C₆H₄—SO₂—O), in a polar solvent such as dimethylformamide, dimethyl sulfoxide, hexamethylphosphoric triamide, a lower ketone such as acetone or methyl ethyl ketone, or a lower alcohol such as methanol or ethanol, in the presence of an alkali metal or an alkaline earth metal carbonate or bicarbonate, or a tertiary amine, for example, pyridine or triethylamine, in a manner well known to organic chemists also gives rise to the desired product (6). As in the method B, above, depending on whether R″=H or R″≠H, the substituent in the 3-position is linked via a primary or a secondary carbon atom.

In another modification of the preferred embodiment, Reaction Scheme (2) is run using N-nitrosoiminodibenzyl and an ester of 4 - oxo-1-piperidinecarboxylic acid (13, R=COOR°). Particularly preferred is the commercially available ethyl ester. The resulting product (6, R=COOR°)

is hydrolytically or reductively decarboxylated to the base (8), which then can be converted to another end product by one of the methods described above [Reaction Scheme (3)].

Conditions for the conversion of (6) (R=COOR°) to (6) (R=H) depend on the nature of the alcohol with which the starting 4 - oxo-1-piperidinecarboxylic acid is esterified. When R° is a lower alkyl group such as methyl or ethyl, basic conditions such as heating with a solution of sodium or potassium hydroxide in aqueous lower alcohol, aqueous dimethyl sulfoxide or aqueous alcoholic dimethyl sulfoxide are used. When R° is a *tert*-butyl or a 2-tetrahydropyranyl moiety, aqueous hydrochloric acid or aqueous alcoholic hydrochloric acid is the preferred hydrolyzing reagent; while catalytic hydrogenation over a noble metal catalyst, such as palladium-on-charcoal, in an aqueous alcoholic or acetic acid medium, is the method of choice for converting (6) (R°=COOR) to (6) (R=H) when R° is benzyl.

In a yet further modification of the preferred embodiment, N-nitrosoiminodibenzyl is condensed with an N-acyl derivative of 4-piperidone

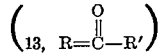

in accordance with Reaction Scheme (2) to yield compound (9) directly. Again, this method is particularly advantageous when commercially available 1-acetyl-4-piperidone

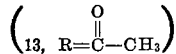

is used as the starting material. The amide (9), 3-acyl-1,2,3,4,8,9-hexahydropyrido[4′,3′:2,3]-indolo[1,7-ab][1]benzazepine, can, if desired, be reduced to (10) as described under A, above, or it can be hydrolyzed under basic conditions to (8), which in turn, if desired, can be converted to yet other end products by one of the methods described above [Reaction Scheme (3)].

This invention is now illustrated by the following representative examples of certain preferred embodiments thereof, in which all temperatures are given in degrees centigrade. The symbol TLC refers to analysis by thin layer chromatography, in which glass plates coated with a 0.25 mm. layer of silica gel containing fluorescent indicator F-254 (manufactured by E. Merck AG, Darmstadt) are used. The symbol is followed in parentheses by the solvents and the proportions, by volume, in which they are used as the developing agents.

EXAMPLE 1

1,2,3,4,8,9-hexahydropyrido[4′,3′:2,3]-indolo[1,7-ab][1]benzazepine (formula 8; X=X′=Y=Y′=H)

Method I.—To a mixture of 4.5 g. of N-nitrosoiminodibenzyl (10,11-dihydro - 5 - nitroso - 5H - dibenz[b,f]azepine), 6.0 g. of 4-piperidone hydrochloride and 6.5 g. of zinc dust in 30 ml. of absolute ethanol 12 ml. of glacial acetic acid are added dropwise, with constant stirring. Occasonal cooling in an ice-bath is required to maintain the temperature at 20–25° during the course of the reaction. After four hours, the unchanged zinc is filtered off, washed with a minimum of absolute ethanol, and to the combined filtrate and wash there is added with stirring 8 ml. of concentrated sulfuric acid in 50 ml. of absolute ethanol. Stirring is continued while the mixture is warmed for about ten minutes, until the alcohol begins to reflux. It is then cooled down again; the inorganic insolubles are filtered off, and approximately 500 ml. of water is added to the filtrate, resulting in a voluminous white precipitate. The whole mixture is extracted with ether, and the residual aqueous phase is warmed up to transform the precipitate into granular solids, which are then filtered off and redissolved in approximately 600 ml. aqueous acetic acid. Some warming is required to completely dissolve all material. On treating this solution with 3N aqueous ammonia, the title compound (I) is obtained as a tan-white granular solid m.p. 134–137°.

To a solution of 2.7 g. of (I) in 150 ml. acetone is added a solution of 960 mg. methanesulfonic acid in 20 ml. of acetone; the resulting solution is dilted with approximately 25 ml. of n-pentane and allowed to stand at −20°. The solid which forms is recrystallized from 4:1 acetone-isopropanol, to yield an off-white 1,2,3,4,8,9-hexahydropyrido[4′,3′:2,3]indolo[1,7 - ab][1]benzazepine mesylate (II), which, after drying at 138° and 0.05 mm. pressure for 20 hours melts at 194.5–197°. This salt is soluble in water to the extent of more than 10 weight percent.

Method II.—A mixture of 24.6 g. of N-aminoiminodibenzyl (5-amino-10,11-dihydro-5H - dibenz[b,f]azepine) and 14.8 g. of 4-piperidone hydrochloride in 250 ml. ethanol is heated on a steam bath for 15 minutes and cooled; a solution of 20 g. of concentrated sulfuric acid in 250 ml. ethanol is added. The resulting mixture is reheated on the steam bath for an additional 40 minutes; the solution which forms is cooled, basified with ammonia, and diluted with 1 l. of water. The crude, semi-solid base which separates is taken up in ether, and the aqueous mother liquors are extracted with additional portions of ether. The combined ethereal extracts are concentrated to 500 ml., and treated, under an atmosphere of nitrogen and with vigorous stirring, with 50 ml. of 5N hydrochloric acid. The resulting precipitate is filtered off, washed with ether and 1N hydrochloric acid, and dried in vacuo at 100° to yield 1,2,3,4,8,9-hexahydropyrido-[4′,3′:2,3]indolo[1,7 - ab][1]benzazepine hydrochloride (III), m.p. 309°, a salt only very slightly soluble in water. Dissolving (III) in aqueous acetic acid, basifying with ammonia, filtering off the crude product and recrystallizing it from benzene regenerates the free base in the form of a solvate which by TLC (8% diethylamine in benzene) is identical with the free base of Method I.

EXAMPLE 2

3-acetyl - 1,2,3,4,8,9 - hexahydropyrido[4′,3′:2,3]indol-[1,7-ab][1]benzazepine (formula 9; R′=CH₃; X=X′=Y=Y′=H)

To a mixture of 9.0 g. of N-nitrosoiminodibenzyl, 12.4 g. of 1-acetyl-4-piperidone and 13.0 g. zinc dust in 75 ml. absolute ethanol there is added dropwise 24 ml. of glacial acetic acid with constant stirring and occasional cooling to keep the reaction temperature at 20–25° C. After six hours, the unchanged zinc is filtered off and the mother liquor evaporated to near dryness. After extracting the residues with benzene, the extract is washed with saturated sodium chloride solution, dried over magnesium sulfate, and the solvent stripped off. The yellowish-brown residue is dissolved in 50 ml. ethanol, treated with a solution of 8 ml. concentrated sulfuric acid in 50 ml. ethanol, and heated on a steam bath for about ten minutes. On pouring into cold water, a gum separates, from which the aqueous layer can be decanted. After dissolving the gum in ethyl acetate, the solution is washed with saturated sodium chloride solution and dried over sodium sulfate. Evaporation of the solvent gives a yellowish-white solid, which on crystallization from acetone yields the title compound (IV) as a white solid, m.p. 193–196°.

One gram of (IV) is refluxed in a solution of 2.5 g. potassium hydroxide in 50 ml. methanol and 5 ml. water for 30 hours; the solution is poured into water and extracted with ether. The ethereal extract is washed with saturated sodium chloride until neutral, dried over sodium sulfate, and stripped down to dryness. The residual yellow oil is once again dissolved in ether, and 5N hydrochloric acid is added with vigorous stirring. The salt which precipitates is filtered and dried to give a solid, m.p. 297–300°, identical with (III) by TLC (8% diethylamine/benzene).

EXAMPLE 3

1,2,3,4,8,9 - hexahydropyrido[4',3':2,3]indolo[1,7 - ab]-[1]benzazepine-3-carboxylic acid ethyl ester (formula 9; R'=OC$_2$H$_5$; X=X'=Y=Y'=H)

Method I.—Following the procedure outlined for the preparation of (IV), but using instead of 1-acetyl-4-piperidone an equivalent amount of 4-oxo-1-piperidine-carboxylic acid ethyl ester, a crude product is obtained, which is purified by chromatography on a neutral alumina column eluted with benzene. On recrystallization from ether-petroleum ether (b.p. 30–60°), the title compound (V), m.p. 120–125°, is obtained.

A mixture of 10 g. of this ester (V) and of 16 g. of sodium hydroxide in a solution of 320 ml. ethanol and 20 ml. water in 260 ml. dimethyl sulfoxide is heated at 100° for three hours, and then allowed to remain at room temperature overnight. After partitioning between water and ether, the combined ether extracts are dried and evaporated to dryness. The residue is treated with 5N hydrochloric acid to form a solid which is filtered and washed with ether to give a product melting at 307°, which is identical with (III) by TLC (chloroform-isopropanol-diethylamine-7:3:0.2).

Method II. Reaction of (I) (formula 8;

with ethyl chloroformate in dichloromethane containing an equivalent amount of triethylamine gives a product (formula 9; R'=OC$_2$H$_5$; X=X'=Y=Y'=H) identical with (V) by TLC (8% diethylamine/benzene).

EXAMPLE 4

3 - isobutyl - 1,2,3,4,8,9 - hexahydropyrido[4',3':2,3]indolo[1,7-ab][1]benzazepine hydrochloride (salt of formula 6; R=isobutyl; X=X'=Y=Y=H)

To a solution of 5.5 g. of (I) in 150 ml. of dichloromethane containing 25 ml. of triethylamine a solution of 4.2 ml. of isobutyryl chloride in approximately 25 ml. of dichloromethane is added dropwise, with constant stirring. On heating to reflux, the white precipitate originally formed redissolves. Refluxing is continued for two hours; the solution is cooled, washed with water and with saturated sodium bicarbonate, dried over anhydrous potassium carbonate, and stripped down to a dark gum, which is taken up in hexane, boiled and decolorized. After concentrating the clear solution to 100 ml. and cooling, a gum separates which solidifies completely on standing. After one week, 3-isobutyryl-1,2,3,4,8,9-hexahydropyrido-[4',3':2,3]indolo[1,7-ab][1]benzazepine (VI) (formula 9; R'=isopropyl; X=X'=Y=Y'=H), m.p. 122–124°, is isolated.

A solution of 3.3 g. of (VI) in 50 ml. of tetrahydrofuran is added to a stirred suspension of 1.5 g. lithium aluminum hydride in 100 ml. of tetrahydrofuran, and the mixture is refluxed for four hours with continued stirring. It is then cooled and hydrolyzed with 1N sodium hydroxide, and the aluminum salts are filtered off. The mother liquor is evaporated under reduced pressure, the resulting residue dissolved in ether, and the ether is removed in vacuo after drying. The residual oil is dissolved in a 1:1 mixture of ethyl acetate-benzene and chromatographed on a 14 x 2.2 cm. column of neutral alumina, activity I. The first 150 ml. fraction of eluate, which contains only a single substance as shown by thin layer chromatography, is taken down to dryness; the residual colorless oil is dissolved in ether, and a solid, somewhat gummy salt is precipitated by addition of an excess of ethereal hydrogen chloride. On trituration of the salt with acetone, the title compound (VII) (formula 10; R'=isopropyl;

is obtained as a fine, white solid, m.p. 237–240°.

EXAMPLE 5

1,2,3,4,8,9-hexahydro - 3 - methylpyrido[4',3':2,3]indolo-[1,7-ab][1]benzazepine hydrochloride (salt of formula 6; R=CH$_3$; X=X'=Y=Y'=H)

Following the procedure of Example 2, but using instead of 1-acetyl-4-piperidone an equivalent amount of 1-methyl-4-piperidone, the title compound (VIII) is obtained as an off-white solid, m.p. 259°.

EXAMPLE 6

3 - ethyl - 1,2,3,4,8,9 - hexahydropyrido[4',3':2,3]indolo-[1,7-ab][1]benzazepine hydrochloride (salt of formula 6; R=C$_2$H$_5$; X=X'=Y=Y'=H)

By a procedure similar to the reduction of (VI to (VII), the 3-acetyl compound (IV) is reduced with lithium aluminum hydride in tetrahydrofuran to the title compound (IX), m.p. 270°, identical with authentic material by TLC (chloroform-isopropanol-diethylamine—7:3:0.2).

EXAMPLE 7

3 - (cyclopropylmethyl) - 1,2,3,4,8,9 - hexahydropyrido-[4',3':2,3]indolo[1,7 - ab][1]benzazepine (formula 6; R=cyclopropylmethyl; X=X'=Y=Y'=H)

Method I.—A solution of 10.4 g. of cyclopropanecarbonyl chloride in 50 ml. of dichloromethane is rapidly added to a solution of 12.5 g. of 4-piperidone ethylene acetal (1,4-dioxa-8-azaspiro[4.5]decane) and 20 g. of triethylamine in 200 ml. of dichloromethane, causing the solution to reflux. Heating to reflux with stirring is continued overnight; the mixture is cooled and the precipitated triethylammonium chloride filtered off. The mother liquor is concentrated to about half volume, washed with water, dried over anhydrous potassium carbonate, and stripped to dryness. The residual oil quickly solidifies, and on crystallization from 300 ml. hexane yields 8-(cyclopropylcarbonyl) - 1,4 - dioxa - 8 - azaspiro[4.5]decane, m.p. 72–74°, as white needles. Reduction of 14.0 g. of this compound in 60 ml. freshly chromatographed, peroxide-free ether by dropwise addition to a suspension of 2.5 g. of lithium aluminum hydride in similarly treated ether, followed by three hours of refluxing, yields 8-(cyclopropylmethyl)-1,4-dioxa-8-azaspiro[4.5]decane as a colorless oil. Hydrolysis of this ethylene acetal by refluxing in 2N hydrochloric acid, followed by basification with 50% sodium hydroxide, extraction into ether, drying of the extract, and stripping off the solvent, yields a crude product which distills at 111–122°/16 mm. to give 1-(cyclopropylmethyl)-4-piperidone (X) (13, R=cyclopropyl), shown by gas-liquid chromatography to be 95–99% pure.

To a suspension of 3.8 g. of N-nitrosoiminodibenzyl and 5 g. of zinc dust in 30 ml. absolute alcohol, 5.7 g. of this piperidone (X) is added, followed by 10.2 ml. glacial acetic acid, added dropwise with stirring and occasional cooling to maintain a temperature of 20–25° C. After eight hours, the unchanged zinc is filtered off and the mother liquor evaporated nearly to dryness. The residue is extracted with benzene; the extract is washed with a saturated sodium chloride solution, dried over magnesium sulfate, and evaporated. The residue is dissolved in 50 ml. of ethanol, treated with a solution of 8 ml. of concentrated sulfuric acid in 50 ml. of ethanol, and heated on a steam bath for about ten minutes. The solution is poured into cold water, made basic with concentrated sodium hydroxide, and extracted with ether. The ether extract yields on evaporation 3-(cyclopropylmethyl)-1,2,3,4,8,9-hexahydropyrido[4',3':2,3]indolo[1,7-ab][1]benzazepine, which is recrystallized from 6:1 acetone-water by volume, or from n-heptane, to give the pure title compound (XI), m.p. 94–96°.

On addition of a solution of 10.5 g. of methanesulfonic acid in 20 ml. acetone to a solution of 36 g. of (XI) in 200 ml. acetone, an exothermic reaction occurs, from which the salt separates while the reaction mixture is still hot. Further recrystallization of this salt from 1:1 hexane-isopropanol yields 3 - (cyclopropylmethyl)-1,2,3,4,8,9-hexahydropyrido[4',3':2,3]indolo[1,7-ab][1]benzazepine methanesulfonate (XII), m.p. 220–221°, a crystalline, white solid which is soluble in water to the extent of more than 50 weight percent.

Method II.—To a solution of 16.4 g. of (I) in 500 ml. of dichloromethane, 7.3 g. of cyclopropanecarbonyl chloride is added, followed by dropwise addition of 10 ml. of triethylamine. A mildly exothermic reaction takes place, after which stirring of the mixture is continued at room temperature overnight. The mixture is then washed with 1N hydrochloric acid and water, and dried over anhydrous sodium carbonate. On evaporation to dryness, crude 3-(cyclopropylcarbonyl) - 1,2,3,4,8,9 - hexahydropyrido - [4',3':2,3]indolo[1,7-ab][1]benzazepine (formula 9; R'=cyclopropyl, X=X'=Y=Y'=H) is obtained as a glassy product. Recrystallization from ethanol yields the pure compound (XIII), m.p. 154–156°.

A solution of 8.6 g. of (XIII) in 120 ml. of tetrahydrofuran is added dropwise to a suspension of 2.3 g. of lithium aluminum hydride in 180 ml. of tetrahydrofuran. On completion of the addition, the mixture is first refluxed for four hours, then allowed to stir at room temperature overnight and finally decomposed in the usual manner. After filtering off the inorganic salts, the filtrate is dried over anhydrous sodium carbonate, evaporated in vacuo; the residue is dissolved in a 1:1 mixture of ethyl acetate-benzene and chromatographed on a 14 x 2.2 cm. column of basic alumina, activity I. The eluate is taken down to dryness; the residual oil dissolved in absolute alcohol, saturated with ethanolic hydrogen chloride, and once again evaporated to dryness. Upon crystallization of the residue from acetone, 3 - (cyclopropylmethyl) - 1,2,3,4,8,9 - hexahydropyrido[4',3':2,3]indolo[1,7-ab][1]benzazepine hydrochloride (XIV), m.p. 267°, is obtained.

EXAMPLES 8–13

In a like manner as in Example 7, Method II, but using in place of cyclopropanecarbonyl chloride an equimolar amount of cyclobutanecarbonyl chloride,
cyclopentanecarbonyl chloride,
cyclohexanecarbonyl chloride,
exo-7-norcaranecarbonyl chloride,
1-adamantanecarbonyl chloride, and
3-cyclohexene-1-carbonyl chloride, respectively, the following products are obtained:

(XV) 3 - (cyclobutylmethyl) - 1,2,3,4,8,9 - hexahydropyrido[4',3':2,3]indolo[1,7-ab][1]benzazepine hydrochloride, m.p. 256–258° after recrystallization from acetone;
(XVI) 3 - (cyclopentylmethyl) - 1,2,3,4,8,9 - hexahydropyrido[4',3':2,3]indolo[1,7-ab][1]benzazepine hydrochloride, m.p. 227–229° after trituration with acetone;
(XVII) 3-(cyclohexylmethyl) - 1,2,3,4,8,9 - hexahydropyrido[4',3':2,3]indolo[1,7-ab][1]benzazepine hydrochloride, m.p. 227° after trituration with acetone,
(XVIII) 3 - (exo - 7 - norcarylmethyl)-1,2,3,4,8,9-hexahydropyrido[4',3':2,3]indolo[1,7 - ab][1]benzazepine hydrochloride, as the monoacetonate, m.p. 189–192° (dec.) after recrystallization from acetone;
(XIX) 3 - (1 - adamantylmethyl) - 1,2,3,4,8,9-hexahydropyrido[4',3':2,3]indolo[1,7-ab][1]benzazepine hydrochloride, m.p. 278° after recrystallization from ethanol; and
(XX) 3 - [(3 - cyclohexen - 1 - yl)methyl] - 1,2,3,4,8,9-hexahydropyrido[4',3':2,3]indolo[1,7 - ab][1]benzazepine hydrochloride, m.p. 198–200° after recrystallization from acetone.

EXAMPLE 14

1,2,3,4,8,9 - hexahydro - 3 - [(trans-2-methylcyclopropyl)methyl]pyrido[4',3':2,3]indolo[1,7-ab][1]benzazepine hydrochloride [salt of formula 6; R=(trans-2-methylcyclopropyl)methyl; X=X'=Y=Y'=H)

Similarly, as in Example 7, Method II, but using in place of the cyclopropanecarbonyl chloride an equimolar amount of a mixture of cis- and trans- 2-methylcylclopropanecarbonyl chloride, a yellow gum, consisting of a mixture of amides (formula 9; R'=cis-2-methylcyclopropyl and trans-2-methylcyclopropyl), is obtained. Without separation or purification, this mixture is reduced with lithium aluminum hydride in tetrahydrofuran; and the free base, dissolved in benzene, is chromatographed on a 21 x 2.4 cm. column of neutral alumina, activity I. On evaporation of the eluate, a pale yellow oil is obtained, which is dissolved in ether and treated with ethereal hydrogen chloride. The resulting salt is dried to give the title compound (XXI), m.p. about 250° (dec.). TLC (8% diethylamine/benzene) shows that this product moves as a single spot; the cis-isomer of the precursor is apparently reductively cleaved back to the starting material (1) during the lithium aluminum hydride reduction.

EXAMPLE 15

1,2,3,4,8,9 - hexahydro - 3 - [(1 - methylcyclopropyl)methyl]pyrido[4',3':2,3]indolo[1,7 - ab][1]benzazepine hydrochloride (salt of formula 6; R=(1-methylcyclopropyl)methyl; X=X'=Y=Y'=H)

Starting with 1-methycyclopropanecarbonyl chloride and following the procedure of Example 7, Method II, 1,2,3,4,8,9 - hexahydro - 3 - [(1 - methylcyclopropyl)carbonyl]pyrido[4',3':2,3]indolo[1,7 - ab][1]benzazepine (formula 9; R'=1 - methylcyclopropyl; X=X'=Y=Y'=H) is obtained as a dark oil, which gradually solidifies (XXII). Without further purification, a solution of 5.6 g. of this solid in 50 ml. benzene is added to a solution of 7 ml. of Vitride™ [70% solution of sodium bis(2-methoxyethoxy)aluminum hydride, $NaAlH_2(OCH_2CH_2OCH_3)_2$, in benzene] in 50 ml. benzene, and after the initial exothermic reaction has subsided, the mixture is heated, under nitrogen, to reflux for 75 minutes. It is then cooled, decomposed with water; the inorganic precipitates are filtered off; and the benzene solution is washed with water and dried over anhydrous potassium carbonate. It is then filtered through a column of basic alumina, activity I. On evaporation of the eluate, a pale yellow oil is obtained, which is dissolved in ether and treated with ethereal hydrogen chloride to give the title compound (XXIII), which, after drying at 100° and 0.3 mm. pressure melts at 172–177°.

EXAMPLE 16

5,12 - dichloro - 1,2,3,4,8,9 - hexahydro - 3 - methylpyrido[4',3':2,3]indolo[1,7 - ab][1]benzazepine (formula 6; R=CH$_3$; X=Y'=Cl; X'=Y=H)

A solution of 3.33 g. of sodium nitrite in 10 ml. water is added to a solution of 6.2 g. of 3,7-dichloro-10,11- dihydro - 5H - dibenz[b,f]azepine in 70 ml. acetic acid at such a rate as to keep the reaction temperature below 18°. On completion of this addition, 50 ml. of water is added, and the mixture is allowed to stand for a few hours. The resulting solid is then filtered off to give 3,7-dichloro-10,11-dihydro-5 - nitroso - 5H - dibenz[b,f]azepine (XXIV), (12; $X=Y'=Cl$; $X'=Y=H$), m.p. 128–131°.

By the procedure of Example 5, the crude title compound is obtained, which on crystallization from ethanol melts at 153–156°. One further recrystallization from isopropanol yields 5,12 - dichloro - 1,2,3,4,8,9-hexahydro-3 - methylpyrido[4',3':2,3]indolo[1,7 - ab][1]benzazepine (XXV) m.p. 155.5–157°.

EXAMPLE 17

1,2,3,4,8,9 - hexahydro - 3,5,12 - trimethylpyrido[4',3':2,3]indolo[1,7 - ab][1]benzazepine hydrochloride (salt of formula 6; $R=CH_3$; $X=Y'=CH_3$; $X'=Y=H$)

To a solution of 10,11-dihydro-3,7-dimethyl-5H-dibenz[b,f]azepine in 80 ml. dimethylformamide containing 2.3 g. of sodium nitrite in an ice-water bath, 35 ml. of 2N hydrochloric acid is added dropwise, with stirring, at a rate such that the reaction temperature is kept between 0° and 5°. Stirring is continued for another half hour, and the reaction mixture is diluted with 100 ml. water. The product formed is filtered off to give 10,11-dihydro-3,7 - dimethyl - 5 - nitroso - 5H - dibenz[b,f]azepine (XXVI) (12; $X=Y'=CH_3$; $X'=Y=H$), m.p. 123–125°.

Using this nitroso compound in the process of Example 5, the title compound (XXVII), m.p. 265–268° (dec.) is obtained.

EXAMPLE 18

3 - (1 - cyclopropylethyl) - 1,2,3,4,8,9 - hexahydropyrido[4',3':2,3]indolo[1,7 - ab][1]benzazepine hydrochloride (formula 11; $R'=$cyclopropyl; $R''=CH_3$; $X=X'=Y=Y'=H$)

Method I.—To a solution of 5.5 g. of (I), 3.4 g. of cyclopropyl methyl ketone (Scheme 3, path B; $R'=$cyclopropyl; $R''=CH_3$), and 0.4 g. of methanesulfonic acid in 50 ml. methanol, containing 5 g. of Linde 3A molecular sieve, 1.24 g. of NaBH$_3$CN is added, and the mixture is allowed to stand at room temperature for 3 days. At the end of that time, it is filtered; the filtrate is acidified to pH 1 with dilute sulfuric acid to decompose excess reagent, basified with aqueous sodium hydroxide, and diluted with approximately 75 ml. water. The resulting basic solution is extracted with chloroform, and the latter is evaporated off to leave a heavy, dark oil, which is taken up in 25 ml. benzene and chromatographed on a 20 x 2.2 cm. column of neutral alumina, activity I. The column is eluted, first with 250 ml. benzene, then with 250 ml. of benzene-ethyl acetate 9:1, and finally with 250 ml. benzene-ethyl acetate 8:2. Since by TLC (8% diethylamine/benzene) the last fraction is contaminated with unchanged (I), only the first two fractions are worked up. Each solution is evaporated; the combined residual yellow oils are dissolved in ether; and an ethereal solution of hydrogen chloride is added to the solution. The resulting precipitate is recrystallized by dissolving it in acetone and adding ether to the solution to the point of turbidity. On standing, the title compound (XXVIII) precipitates as a crystalline white salt, m.p. 259–260°.

Method II.—A mixture of 5.5 g. of (I), 2.3 g. of 1-chlorothyl)cyclopropane (Scheme 3, path C; $R'=$cyclopropyl; $R''=CH_3$; $Q=Cl$) and 3.0 g. of sodium bicarbonate in 100 ml. dimethylformamide is heated overnight at 70° with continuous stirring, after which the reaction mixture is poured into water and extracted with ether. The extract is dried, the ether evaporated off, the residue dissolved in benzene and chromatographed, as in Method I, above. The eluate is evaporated to dryness, the residue dissolved in absolute alcohol, treated with alcoholic hydrogen chloride, and stripped down to dryness. The glassy residue is triturated with acetone to yield white crystals, m.p. 253–255°, identical with (XXVIII) by TLC (8% diethylamine/benzene).

EXAMPLE 19

1,2,3,4,8,9 - hexahydro - 3 - (tetrahydrofurfuryl)pyrido[4',3':2,3]indolo[1,7 - ab][1]benzazepine hydrochloride (salt of formula 6; $R=$tetrahydrofurfuryl; $X=X'=Y=Y'=H$)

By a procedure similar to that of Example 18, Method II, but using 3.6 g. of 2-(bromomethyl)tetrahydrofuran (formula C, $R'=$tetrahydrofuryl; $R''=H$; $Q=Br$) in place of the (1-chloroethyl)cyclopropane, and heating to mild reflux for 105 minutes, an oily product is obtained, which on trituration with ethanol-ether yields a crystalline product, m.p. 213–217°. On recrystallization from ethanol-ether, followed by drying for five hours at 100°, the title compound (XXIX), m.p. 215–218°, is obtained.

EXAMPLE 20

3-cyclopropyl - 1,2,3,4,8,9 - hexahydropyrido-[4',3':2,3]indolo[1,7-ab][1]benzazepine hydrochloride (salt of formula 6; $R=$cyclopropyl; $X=X'=Y=Y'=H$)

Method I.—A mixture of 28.5 g. of cyclopropylamine and 100 g. of ethyl acrylate is stirred at room temperature for 20 hours, and from the reaction mixture diethyl 3,3'-(cyclopropylimino)dipropionate is distilled, b.p. 122–124° at 0.8 mm. Hg. A solution of 21.3 g. of this diester in 30 ml. benzene is added dropwise to a cooled suspension of 8.0 g. of sodium hydride in a mixture of 150 ml. benzene with 5 ml. ethanol. Soon an exothermic reaction starts, which at first requires occasional cooling; after heat evolution subsides, the reaction mixture is allowed to stand at room temperature overnight. The next morning it is heated on a steam bath for one hour, cooled, and decomposed with 20 g. acetic acid and 13.5 g. water. After filtering off the solids, the benzene solution is washed with aqueous bicarbonate, dried over anhydrous sodium sulfate, and stripped to dryness. On cooling the oily product in the refrigerator for three days and triturating with hexane, crystalline ethyl 1-cyclopropyl-4-oxo-3-piperidinecarboxylate is obtained. After refluxing 17.8 g. of this ester in 90 ml. of 6N hydrochloric acid for one hour, and taking the resulting solution down to dryness, the solid residue is triturated with hot isopropyl alcohol to yield 1-cyclopropyl-1-piperidone hydrochloride (XXX), m.p. 209–210°.

A mixture of 2.5 g. of N-aminoiminodibenzyl hydrochloride and 2.1 g. of the above piperidone (XXX) in 25 ml. ethanol is heated on the steam bath for 15 minutes and cooled; a solution of 2 g. of concentrated sulfuric acid in 25 ml. of ethanol is added. An exothermic reaction takes place, after which the reaction mixture is heated for 10 more minutes on a steam bath, and poured into water. The resulting turbid suspension is basified with aqueous ammonia, and the resulting solid is taken up in ether. After further extractions with ether, the combined extracts are dried; the solvent is evaporated; and the residue is dissolved in ethanol and treated with ethanolic hydrogen chloride. The solvent is once again evaporated, and the remaining salt is crystallized from ethyl acetate-ether, and recrystallized from acetone-ether, to yield the title compound (XXXI), m.p. 218–220°.

Method II.—Reaction of N-nitrosoiminodibenzyl with (XXX) by the method of Example 2 yields 3-cyclopropyl-1,2,3,4,8,9 - hexahydropyrido[4',3':2,3]indolo[1,7-ab][1]benzazepine hydrochloride, m.p. 205°, identical with (XXXI) by TLC (three systems: 8% diethylamine/benzene; chloroform-isopropyl alcohol-diethylamine—7:3:0.2; benzene-ethyl acetate—2:1).

EXAMPLE 21

3 - allyl - 1,2,3,4,8,9 - hexahydropyrido[4',3':2,3]indolo[1,7-ab][1]benzazepine (formula 6; R=allyl; X=X'=Y=Y'=H)

A mixture of 3.3 g. of (I), 1.45 g. of freshly distilled 3-bromopropene and 1.7 g. of sodium bicarbonate is stirred at room temperature, for 24 hours, in 50 ml. dimethylformamide. At the end of this period, the mixture is poured into water, extracted with ether, and the combined extracts are dried and stripped down. The residue is dissolved in benzene, and the resulting solution chromatographed through a column of neutral alumina. The oily residue obtained on stripping down the eluate is recrystallized from isopropyl alcohol to yield the title compound (XXXII), m.p. 112–113°.

EXAMPLES 22–25

By a similar procedure to that used in Example 21, but using instead of 3-bromopropene an equivalent amount of 3-chloro-2-methylpropene,
trans-1-chloro-2-butene,
1-chloro-3-methyl-2-butene, and
3-bromopropyne, respectively, the following products are obtained:

(XXXIII) 1,2,3,4,8,9-hexahydro - 3 - (2-methylallyl)pyrido[4',3':2,3]indolo[1,7]-ab][1]benzazepine hydrochloride, m.p. 235–237° after recrystallization from isopropanol-ether;

(XXXIV) 3-(trans - 2 - butenyl)-1,2,3,4,8,9-hexahydropyrido[4',3':2,3]indolo[1,7-ab][1]benzazepine hydrochloride, m.p. 140–143°;

(XXXV) 1,2,3,4,8,9-hexahydro - 3 - (3-methyl-2-butenyl)pyrido[4',3':2,3]indolo[1,7-ab][1]benzazepine hydrochloride, m.p. 143–146°; and (XXXVI) 1,2,3,4,8,9-hexahydro - 3 - (2-propynyl)pyrido[4',3':2,3]indolo[1,7 - ab][1]benzazepine hydrochloride, m.p. 145–148° after trituration of the crude product with ethanol-ether followed by vacuum drying at 100° for five hours.

EXAMPLE 26

3 - benzyl - 1,2,3,4,8,9 - hexahydropyrido[4',3':2,3]indolo[1,7-ab][1]benzazepine hydrochloride (salt of formlua 6; R=benzyl; X=X'=Y=Y'=H)

Following the procedure of Example 2, but using instead of 1-acetyl-4-piperidone an equivalent amount of 1-benzyl-4-piperidone, a crude product is obtained, which is dissolved in ethanol. The solution is saturated with ethanolic hydrogen chloride, and the solvent is stripped off. On trituration of the residue with ethyl acetate, the title compound (XXXVII) is obtained as an off-white solid, m.p. 200°.

EXAMPLE 27

3 - (2-butynyl) - 1,2,3,4,8,9 - hexahydropyrido[4',3':2,3]indolo[1,7-ab][1]benzazepine hydrochloride (salt of formula 6; R=2-butynyl; X=X'=Y=Y'=H)

A mixture of 42.9 g. of 4-piperidone ethylene acetal (1,4-dioxa-8-azaspiro[4.5]decane) [Stach et al., Monatsh. 93, 1090 (1962)], 37.5 g. of 1,3-dichloro-2-butene and 45 g. of anhydrous potassium carbonate is refluxed for 18 hours, with continuous stirring, in 300 ml. of methyl ethyl ketone. The resulting mixture is cooled and filtered; the filtrate is evaporated to dryness to yield an orange oil, which is taken up in 450 ml. ether; the ethereal layer is washed with water, dried over anhydrous potassium carbonate, and evaporated. The residual light orange oil is distilled at reduced pressure to yield 8-(3-chloro-2-butenyl)-1,4-dioxa - 8 - azaspiro[4.5]decane (XXXVIII) as a clear, colorless liquid, b.p. 94–96°/0.25 mm. After stirring a mixture of 16.3 g. of XXXVIII and 18 g. of powdered potassium hydroxide in 50 ml. of diethylene glycol on a steam bath for two hours, heating with stirring is continued for additional 75 minutes under an atmosphere of nitrogen, in an oil bath, at 165–170°. The mixture is cooled down, treated with 50 ml. water, and extracted three times with 75 ml. portions of chloroform. The combined chloroform extracts are washed twice with water, dried over anhydrous potassium carbonate, and evaporated under vacuum. On distillation of the residual oil under reduced pressure, followed by redistillation under the same conditions, 8-[2-butynyl)-1,4-dioxa-8-azaspiro[4.5]decane (XXXIX) is obtained as a colorless oil, b.p. 89–95°/0.10 mm. Refluxing 7.3 g. of this acetylenic acetal (XXXIX) in 50 ml. of 4N hydrochloric acid for three hours, followed by basification with concentrated aqueous ammonia, extraction with three portions of chloroform, washing of the chloroform extracts with water, and drying them over anhydrous sodium sulfate, yields, on evaporation of the solvent, the hydrolysis product 1-(2-butynyl)-4-piperidone (XL), as a yellow oil, which distills at 67.5–69°/0.20 mm.

By the procedure of Example 2, using instead of 1-acetyl-4-piperidone an equimolar amount of 1-(2-butynyl)-4-piperidone (XL), a gum is obtained which in this case is extracted with chloroform instead of with ethyl acetate. The combined chloroform extracts are dried over anhydrous potassium carbonate and evaporated to dryness; the residue is taken up in benzene and chromatographed on a 20 x 2.2 cm. column of neutral alumina, activity I. The benzene eluate is taken down to dryness; the residue is dissolved in anhydrous ether and treated with ethereal hydrogen chloride. The resulting precipitate is filtered, and recrystallized from acetone. After standing overnight at —20° the title compound (XLI) is obtained as a microcrystalline white solid, which, after drying at 100°/0.5 mm. for four hours, starts to sinter at about 170°, and then melts at 173–175° with decomposition.

We claim:
1. A process for the preparation of a compound having the formula

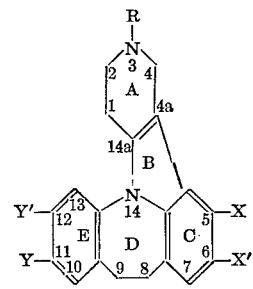

wherein

R is hydrogen, methyl, 2-butynyl, cyclopropyl, cyclopropylmethyl, benzyl, acetyl or ethoxycarbonyl; and
X, X', Y' and Y individually are hyrogen, fluorine, chlorine, bromine, trifluoromethyl, a $C_1$–$C_4$ alkyl or a $C_1$–$C_4$ alkoxyl; provided that one of X and X' and one of Y and Y' must be hydrogen;

said process comprising the following sequential steps:
A. contacting a nitrosoiminodibenzyl having the formula

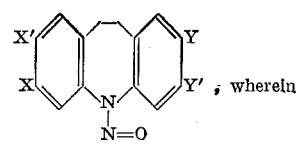

X, X', Y, and Y' have the above-defined meaning, with a 4-piperidone having the formula

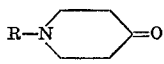

R has the above-defined meaning,
and with metallic zinc in the presence of glacial acetic acid and a reduction-resistant solvent at 15–35° C.;
B. maintaining the reaction mixture at a temperature of 20–25° C. with good agitation for an additional period of several hours;
C. separating the liquid from the solid;
D. contacting the liquid with a strong acid at a temperature of 50–80° C.; and
E. recovering the desired product from the solution.

2. The process of Claim 1 wherein the temperature of Step A is 20–25° C.

3. The process of Claim 1 used for the preparation of the compound in which each of R, X, X', Y, and Y' is hydrogen.

4. The process of Claim 1 used for the preparation of the compound in which R is the acetyl group and each of X, X', Y, and Y' is hydrogen.

5. The process of Claim 1 used for the preparation of the compound in which R is methyl and each of X, X', Y, and Y' is hydrogen.

6. The process of Claim 1 used for the preparation of the compound in which R is the ethoxycarbonyl group and each of X, X', Y, and Y' is hydrogen.

7. The process of Claim 1 used for the preparation of the compound in which R is cyclopropylmethyl and each of X, X', Y and Y' is hydrogen.

8. The process of Claim 1 used for the preparation of the compound in which R is methyl; each of X' and Y is hydrogen; and each of X and Y' is methyl.

9. The process of Claim 1 used for the preparation of the compound in which R is benzyl and each of X, X', Y, and Y' is hydrogen.

10. The process of Claim 1 used for the preparation of a compound in which R is methyl; each of X' and Y is hydrogen; and each of X and Y' is chlorine.

References Cited

UNITED STATES PATENTS

| | | | |
|---|---|---|---|
| 3,373,168 | 3/1968 | Cohen et al. | 260—294.8 A |
| 3,457,271 | 7/1969 | Cohen et al. | 260—296 P |
| 3,373,154 | 3/1968 | Cohen et al. | 260—239 |
| 3,373,153 | 3/1968 | Cohen et al. | 260—239 D |

FOREIGN PATENTS

| | | | |
|---|---|---|---|
| 1,149,507 | 4/1969 | Great Britain | 260—296 P |

OTHER REFERENCES

Karrer, Organic Chemistry, 4th English Edition, p. 928, Elsevier Pub. Co., New York, 1950.

Sidgwick et al., Organic Chemistry of Nitrogen, Clarendon Press, p. 345, QD 181 NI S5, 1966, C.2.

ALAN L. ROTMAN, Primary Examiner

U.S. Cl. X.R.

260—293.55, 293.59, 295 A, 296 P, 239 D; 424—263, 266